Figure 1:
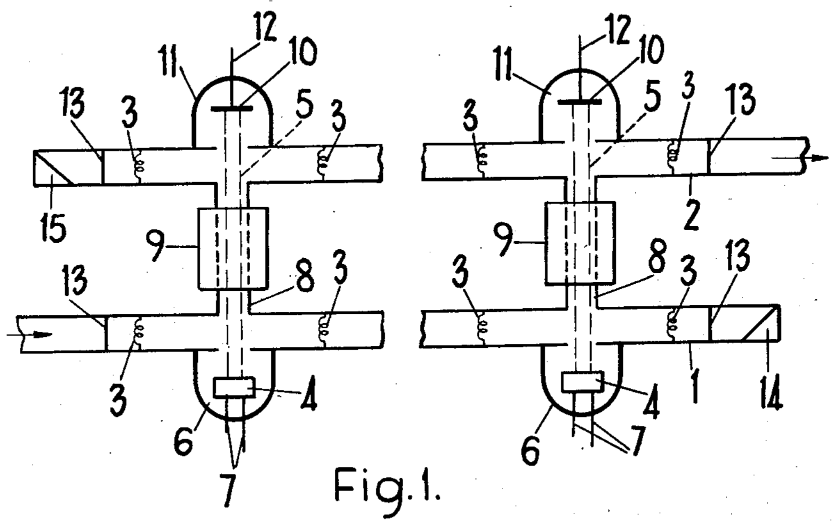

Jan. 5, 1960 G. M. CLARKE 2,920,229

TRAVELING WAVE VELOCITY MODULATION DEVICES

Filed July 20, 1956

INVENTOR
GRAHAM MORLEY CLARKE

BY
Kirschstein, Kirschstein & Ottinger
ATTORNEYS

United States Patent Office 2,920,229

Patented Jan. 5, 1960

2,920,229

TRAVELING WAVE VELOCITY MODULATION DEVICES

Graham Morley Clarke, Edinburgh, Scotland, assignor to The M-O Valve Company Limited, London, England Application July 20, 1956, Serial No. 599,245

Claims priority, application Great Britain July 21, 1955

9 Claims. (Cl. 315—5.16)

This invention relates to traveling wave velocity modulation devices.

One known from of traveling wave velocity modulation device comprises input and output waveguides and means for projecting an electron beam transversely across the input and output waveguides in succession, the electron beam extending continuously along the length of the waveguides, and the arrangement being such that a traveling electromagnetic wave excited in the input waveguide will cause velocity modulation of the electron beam which, after conversion of the velocity modulation to space charge density modulation, will excite in the output waveguide a further traveling electromagnetic wave whose amplitude is built up by interaction with the electron beam as it travels along the output waveguide.

Such a device is capable of being designed for amplification at high power levels over a wide band of signal frequencies. With the form of construction described, however, considerable difficulties arise in practice in focussing the electron beam; these difficulties can be reduced by the use of a series of discrete electron beams spaced apart along the waveguides. The inventor has realised that, where such a modification is adopted, an improvement of the device, for a given operational bandwidth, can be brought about by disposing across each of the input and output waveguides a series of spaced inductive elements and arranging that the electron beams traverse the waveguides at positions situated substantially centrally between pairs of adjacent inductive elements. With such an arrangement the impedance presented by the waveguides at the electron beams is higher than would be the case with the corresponding unloaded waveguide; this means that efficient operation of the device can be obtained with lower beam currents for a given beam voltage, and with lower input power for a given beam voltage and spacing between the waveguides.

Thus according to the present invention, a traveling wave velocity modulation device comprises input and output waveguides each having disposed across it a series of inductive elements spaced apart along the waveguide, and means for projecting a series of discrete electron beams transversely across the input and output waveguides in succession at positions which for each waveguide are situated substantially centrally between pairs of adjacent inductive elements, the arrangement being such that a traveling electromagnetic wave excited in the input waveguide will cause velocity modulation of the electron beams which, after conversion of the velocity modulation to space charge density modulation, will excite in the output waveguide a further traveling electromagnetic wave whose amplitude is built up by interaction with the electron beams as it travels along the output waveguide.

Figure 2:
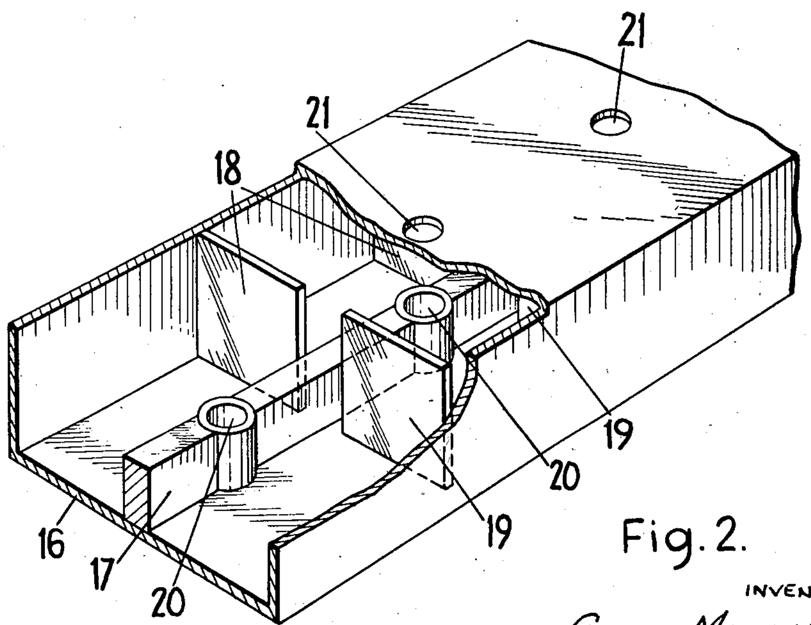

One embodiment of the invention will now be described by way of example with reference to the accompanying drawings, in which:

Figure 1 is a diagrammatic illustration of a traveling wave velocity modulation device in accordance with the invention; and Figure 2 is a perspective view, partly cut away to show internal details, of a form of waveguide which may be used in the device illustrated in Figure 1.

Referring to Figure 1, the device comprises an input waveguide 1 and an output waveguide 2 extending parallel to each other, the waveguides 1 and 2 having disposed respectively across them two identical series of regularly spaced identical inductive elements 3 of conventional form, the inductive elements 3 being disposed at corresponding points along the waveguides 1 and 2 and the cross-sectional dimensions of the waveguides 1 and 2 being identical. The device also includes a series of identical electron sources 4 for furnishing electron beams 5 which are projected across the waveguides 1 and 2 perpendicular to their axes via suitable apertures formed in the walls of the waveguides 1 and 2, electron beams 5 traversing the waveguides 1 and 2 at positions centrally situated between each pair of adjacent inductive elements 3. Each electron source 4 is disposed inside a dome 6 of electrically insulating material through which are sealed leads 7 for the electron source 4, the dome 6 being sealed to the waveguide 1. Each electron beam 5 passes through a drift tube 8 between the waveguides 1 and 2, the drift tube 8 being surrounded by an electromagnet 9 which serves to focus the electron beam 5. After its passage through the waveguide 2, each electron beam 5 impinges on a collector electrode 10 disposed inside a dome 11 of electrically insulating material, the dome 11 being sealed to the waveguide 2 and having sealed through it a lead 12 for the collector electrode 10. Parts of the waveguides 1 and 2 are sealed off by means of windows 13, the space inside the waveguides 1 and 2 between the windows 13, inside the drift tubes 8, and inside the domes 6 and 11 being evacuated. In operation the waveguides 1 and 2 and the drift tubes 8 are all maintained at a high positive potential with respect to the electron sources 4, while the collector electrodes 10 are maintained at a slightly more positive potential than the waveguide 2.

An input signal is fed into one end of the input waveguide 1 so as to excite a wave traveling towards the other end of the waveguide 1, which is provided with a reflectionless termination 14. The traveling wave interacts with the electron beams 5 so as to velocity modulate the beams 5, and after passing through the input waveguide 1 each electron beam 5 passes through the corresponding drift tube 8 in which the velocity modulation is converted into space charge density modulation; the modulated electron beam 5 then passes through the output waveguide 2 where it excites waves traveling in both directions. Since the dimensions of the waveguides 1 and 2 are identical, the phase velocities of the waves in the two waveguides at any particular frequency are the same, so that the contributions of the electron beams 5 to the forward wave in the output waveguide 2 (that is the wave traveling in the same direction as that in the input waveguide 1) reinforce each other; thus a build-up of the wave takes place in this direction and an amplified output signal appears at the end of the output waveguide 2 towards which the forward wave is traveling. The other end of the output waveguide 2 is provided with a reflectionless termination 15. The contributions of the electron beams 5 to the reverse wave in the output waveguide 2 will reinforce each other only to a substantial extent at frequencies at which the effective phase change between successive electron beams 5 is at or near zero or a multiple of $\pi$ radians. With the arrangement described, this condition is satisfied only for frequencies at the ends of the pass band of the waveguides 1 and 2, so that a build-up of the reverse wave will take place only at such frequencies. It may be desirable to avoid difficulties due to this effect by restricting the bandwidth of the input signal so that it does not include any such frequencies.

Referring now to Figure 2, there is shown in this figure a form of construction which may be used for the waveguides 1 and 2 of the device illustrated in Figure 1. In this form of construction, the waveguide consists of a metal tube 16 of rectangular cross-section having a longitudinal internal metal ridge 17 projecting perpendicularly from the centre of one of its broader faces. Each inductive element 3 takes the physical form of an iris constituted by a pair of identical thin rectangular metal plates 18 and 19 disposed in the same plane across the tube 16 perpendicular to its axis; each of the plates 18 and 19 has a height equal to the smaller internal dimension of the cross-section of the tube 16, the plates 18 and 19 respectively extending inwardly from opposite narrower faces of the tube 16 so as to leave a gap between the plates 18 and 19 through which the ridge 17 passes centrally. Midway between each pair of adjacent irises, the ridge 17 is interrupted to accommodate a metal tube 20 of circular cross-section and having a length equal to the height of the ridge 17; the outer diameter of each tube 20 is made only slightly greater than the width of the ridge 17, so that the insertion of the tubes 20 has a negligible effect on the uniformity of the cross-section of the waveguide. Each tube 20 communicates with a circular aperture (not visible in the drawing) formed in the broader face of the tube 16 from which the ridge 17 projects, one of the electron beams 5 being arranged to pass through this aperture and the tube 20 and also through a corresponding aperture 21 formed in the opposite broader face of the tube 16. It will be appreciated that the modulation gap for the electron beam 5 is formed between the periphery of the aperture 21 and the opposing end face of the tube 20. The use of the tubes 20 and the ridge 17 ensures that the coupling coefficient of the gaps is high without involving an undue decrease in the impedance presented by the waveguide to the electron beams 5. The height of the ridge 17 will normally be chosen so as to maximise the product of the impedance presented by the waveguide to each electron beam 5 and the square of the coupling coefficient of each modulation gap.

In an alternative arrangement to that described above, instead of providing an electron beam 5 in each section between successive inductive elements 3, the electron beams 5 may be spaced further apart. If the electron beams 5 occur once every nth section, the condition for substantial build up to the reverse wave in the output waveguide 2 will be satisfied in $(n-1)$ ranges of frequencies intermediate between the ends of the pass band, in addition to the ranges of frequencies at the ends of the pass band mentioned above. If a narrow bandwidth for the device can be tolerated, this fact may be utilised by removing the reflectionless termination 15 in the output waveguide 2 and feeding the reverse wave from the waveguide 2 to a suitable junction to combine it with the forward wave.

A further modification which may be made in the arrangement described above is to vary the impedances presented by one or other of the waveguides 1 and 2 to the electron beams 5 along the length of the waveguide 1 or 2 by varying the nature of the inductive elements 3. One particular case in which this is advantageous is where the impedance presented by the output waveguide 2 to the electron beams 5 is made high for the initial electron beams 5 so that a rapid build up of the voltage of the forward wave in the output waveguide 2 is obtained up to a point at which this voltage reaches its maximum desirable value, this value being determined by the occurrence of reversal of the direction of some of the electrons in an electron beam 5 at the modulation gap of the output waveguide 2. After this point in the output waveguide 2, the impedances presented by the waveguide 2 to successive electron beams 5 are progressively reduced by varying the values of the inductive elements 3 in such a manner that the power in the forward wave in the output waveguide 2 continues to build up without a corresponding build up in the voltage of this wave. Such a variation of the impedance level in the output waveguide 2 will normally require a corresponding variation of the impedance level in the input waveguide 1 in order to ensure synchronism of the phase velocities of the waves traveling in the two waveguides, although this will result in some decrease in the efficiency of velocity modulation of the later electron beams 5 at the input waveguide 1.

It will be appreciated that in all the arrangements described above it is desirable that the lengths of the drift tubes 8 between the input and output waveguides 1 and 2 should be such as to bring about optimum bunching in the electron beams 5. Furthermore, it will usually be desirable for the beam current to be the same for all the electron beams 5.

I claim:

1. A traveling wave velocity modulation device comprising non-resonant input and output waveguides each having disposed across it a series of inductive elements spaced apart along the waveguide, means for projecting a series of discrete electron beams transversely across the input and output waveguides for interaction with electromagnetic waves traveling along the waveguides, the electron beams traversing the input and output waveguides in succession at positions which for each waveguide are situated substantially centrally between pairs of adjacent inductive elements, and means defining drift spaces between the input and output waveguides for conversion of velocity modulation of the electron beams to space charge density modulation.

2. A traveling wave velocity modulation device according to claim 1, in which the input and output waveguides are of the same substantially uniform cross-section, and the series of inductive elements is the same for each waveguide, each electron beam traversing the input and output waveguides at corresponding positions in relation to the two series of inductive elements.

3. A traveling wave velocity modulation device according to claim 2, in which the spacings between pairs of adjacent inductive elements of each series are the same throughout the series.

4. A traveling wave velocity modulation device according to claim 3, in which all the inductive elements of each series are identical.

5. A traveling wave velocity modulation device according to claim 4, in which the spacings along each waveguide between pairs of adjacent electron beams are the same throughout the series of electron beams.

6. A traveling wave velocity modulation device according to claim 5, in which the spacings along each waveguide between pairs of adjacent electron beams are greater than the spacings between pairs of adjacent inductive elements.

7. A traveling wave velocity modulation device according to claim 1, in which the beam current is the same for all the electron beams.

8. A traveling wave velocity modulation device according to claim 1, in which each waveguide is in the form of a metal tube of rectangular cross-section having a longitudinal internal metal ridge projecting perpendicularly from the centre of one of its broader faces, each electron beam traversing the waveguide perpendicularly to its broader faces at a position centrally situated with respect to its broader faces.

9. A traveling wave velocity modulation device according to claim 8, in which each inductive element is in the form of an iris which is constituted by a pair of identical thin rectangular metal plates disposed in the same plane across the metal tube perpendicular to its axis, each of the plates having a height equal to the smaller internal dimension of the cross-section of the metal tube and the plates respectively extending inwardly from opposite narrower faces of the metal tube so as to leave a gap between the plates through which the ridge passes centrally.

References Cited in the file of this patent

UNITED STATES PATENTS

| | | |
|---|---|---|
| 2,367,295 | Llewellyn | Jan. 16, 1945 |
| 2,416,168 | Fiske | Feb. 18, 1947 |
| 2,458,556 | Bowen | Jan. 11, 1949 |
| 2,482,766 | Hansen | Sept. 27, 1949 |
| 2,556,881 | McArthur | June 12, 1951 |
| 2,719,954 | Palluel | Oct. 4, 1955 |

OTHER REFERENCES

Proceedings of IRE, vol. 43, No. 1, January 1955, pp. 41–46.